United States Patent [19]

Lanzer

[11] Patent Number: 4,729,259
[45] Date of Patent: Mar. 8, 1988

[54] INTERAXLE DIFFERENTIAL SYSTEM FOR CONNECTING TWO DRIVEN AXLES OF A MOTOR VEHICLE

[75] Inventor: Heribert Lanzer, Gössendorf, Austria

[73] Assignee: Steyr-Daimler-Puch AG, Vienna, Austria

[21] Appl. No.: 12,736

[22] Filed: Feb. 9, 1987

[30] Foreign Application Priority Data

Feb. 11, 1986 [AT] Austria .................................. 330/86

[51] Int. Cl.⁴ .............................................. F16H 1/44
[52] U.S. Cl. .................................. 74/710.5; 180/248; 180/249
[58] Field of Search ............... 74/710.5, 786; 180/248, 180/249

[56] References Cited

U.S. PATENT DOCUMENTS

| | | | |
|---|---|---|---|
| 2,689,489 | 9/1954 | Storer, Jr. et al. ................. | 74/710.5 |
| 2,874,790 | 2/1959 | Hennessey ..................... | 74/710.5 X |
| 3,605,965 | 9/1971 | Thomas et al. .................... | 192/85 C |
| 3,760,922 | 9/1973 | Rolt et al. ....................... | 74/710.5 X |
| 3,780,821 | 12/1973 | Prange ........................... | 74/710.5 X |
| 4,644,823 | 2/1987 | Mueller .......................... | 74/710.5 X |

FOREIGN PATENT DOCUMENTS

| | | |
|---|---|---|
| 0118155 | 9/1984 | European Pat. Off. . |
| 269581 | 10/1912 | Fed. Rep. of Germany . |
| 986538 | 8/1951 | France . |
| 1024532 | 4/1953 | France . |
| 0063525 | 4/1983 | Japan ........................ 180/248 |
| 81/01596 | 6/1981 | PCT Int'l Appl. . |
| 84/04792 | 12/1984 | PCT Int'l Appl. . |
| 85/01784 | 4/1985 | PCT Int'l Appl. . |
| 177724 | 12/1961 | Sweden ......................... 180/249 |
| 620723 | 3/1949 | United Kingdom . |
| 1210964 | 11/1970 | United Kingdom . |
| 0821239 | 4/1981 | U.S.S.R. ........................ 74/710.5 |

Primary Examiner—Dirk Wright
Attorney, Agent, or Firm—Marmorek, Guttman & Rubenstein

[57] ABSTRACT

An interaxle differential system connecting two driven axles of a motor vehicle comprises a restrainable differential and a planetary gear train, which comprises three torque-transmitting members which have parallel axes. Two of said torque-transmitting members are operatively connected to two output shafts of the differential. A restraining device is connected to the third of said torque-transmitting members. In an interaxle differential system for use in a passenger car, the restraining device is a controllable liquid friction coupling, one coupling half of which is held against rotation.

6 Claims, 3 Drawing Figures

INTERAXLE DIFFERENTIAL SYSTEM FOR CONNECTING TWO DRIVEN AXLES OF A MOTOR VEHICLE

BACKGROUND OF THE INVENTION

1. Field of the Invention

This invention relates to an interaxle differential system for connecting two driven axles of a motor vehicle, which differential system comprises an interaxle differential having two output shafts and also comprises a planetary gear train having three torque-transmitting members which have parallel axes and two of which are operatively connected to respective ones of said output shafts, and restraining means for restraining the third of said torque-transmitting elements against rotation.

2. Description of the Prior Art

Means for restraining a differential of a motor vehicle are known, e.g., from European Patent Specification No. 160,671. In that known arrangement a planetary gear train is provided, which has three torque-transmitting elements and constitutes a conventional differential having a housing which is operatively connected by a worm gear train to a servomotor. As the worm gear train is self-locking, it constitutes means for restraining the rotation of the third torque-transmitting member. But in that case the restrainable differential does not constitute an interaxle differential connecting two driven axles of a motor vehicle but serves as a stearing gear train which under the control of the servomotor constrains the restrainable differential to rotate its two output shafts at different speeds. Besides, in the known arrangement the two output shafts of the differential are connected to the torque-transmitting members of the associated planetary gear train by spur gear trains having the same transmission ratio or gears of equal size and an idler gear for reversing the sense or rotation is required on one side. Particularly in passanger cars the space available may be so confined that it is not possible to accommodate gears equal in size on both sides of the restrainable differential. Another disadvantage of the known arrangement resides in the fact that the servomotor must be operated even when the two output shafts of the unrestrained differential are required to have a desired speed difference. Finally, said two output shafts cannot be entirely released to rotate at any desired speed.

Another restrainable differential for use in a motor vehicle is known from British Patent Specification No. 620,723. In that arrangement a planetary gear train extending in one plane is associated with the differential and comprises three torque-transmitting members, two of which are operatively connected to respective output shafts of the differential whereas a brake is associated with the third torque-transmitting member. That arrangement has the disadvantage that the brake must arbitrarily be actuated by the driver and that that known differential constitutes an interwheel differential between the two wheels of an axle rather than an interaxle differential connecting two driven axles of a vehicle.

SUMMARY OF THE INVENTION

It is an object of the invention to eliminate the disadvantages outlined hereinbefore and so to improve the differential system of the kind described first hereinbefore that it can be used as an interaxle differential connecting two driven axles of a motor vehicle, particularly of a passanger care.

That object is accomplished in accordance with one aspect of the invention in that the restraining means consist of a preferably controllable liquid friction coupling comprising a coupling half which is held against rotation.

As the speed difference between the output shafts of the differential increases, such liquid friction coupling will exert an increasing torque, which opposes an increase of said speed difference so that the restraining action will be automatically increased. Another advantage resides in that the coupling can easily be controlled from the outside because one coupling half of the liquid friction coupling is held against rotation.

Alternatively the means for restraining the third torque-transmitting member against rotation may consist of a fluid-operable brake, which permits restraining torques to be exerted with simple means in a wide range, from a fully released to a fully locked condition.

A particularly desirable design, which saves space and structural expenditure, will be obtained if one of the two torque-transmitting members which are connected to the output shafts of the differential comprises a shaft which is operatively connected to the second driven axis of the vehicle.

DETAILED DESCRIPTION OF THE PREFERRED EMBODIMENTS

Figure 1:
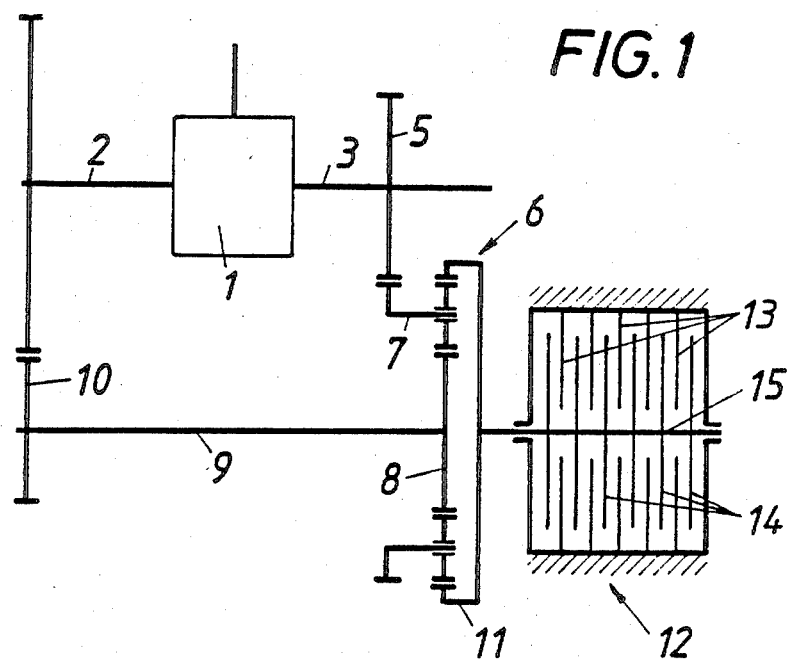
FIG. 1 is a diagrammatic representation showing an embodiment of a drive system for a motor vehicle having two driven axles. In that embodiment the restraining means provided in accordance with the invention are associated with the interaxle differential connecting the two driven axles and includes a liquid friction coupling which restrains the third torque-transmitting member of the planetary gear train against rotation.

Illustrative embodiments of the invention are diagrammatically shown on the drawing.

FIG. 1 shows a restrainable differential 1 which constitutes an interaxle differential connecting two driven axles of a motor vehicle. The differential 1 comprises two output shafts 2, 3, which are connected to respective driven axles and carry respective spur gears 4, 5. The differential 1 is constituted by a planetary gear train 6, which comprises three torque-transmitting members which have parallel axes and extend in a single plane. Said three torque-transmitting members comprise a first member or planet carrier 7, which is in mesh with the spur gear 5, a second member or sun gear 8, which is non-rotatably connected by a shaft 9 to a spur gear 10, which is in mesh with the spur gear 4, and an internal gear or third member 11, which is connected to means for restraining the third member 11 against rotation. In the embodiment shown in FIG. 1 said restraining means are constituted by a liquid friction coupling 12 having a housing, which is held against rotation and is filled with a viscous liquid and carries a set of outer annular discs 13, which are axially spaced apart. The liquid friction coupling also comprises an inner set of circular discs 14, which are also axially spaced apart and each of which extends between two of the outer discs 13. The inner discs 14 are secured to a shaft which is non-rotatably connected to the internal gear 11 and extends into the housing. The liquid friction coupling 12 may be adapted to be controlled in that the liquid pressure in the housing or the distance between the outer and inner discs 13, 14 may be changed in known manner.

Figure 2:
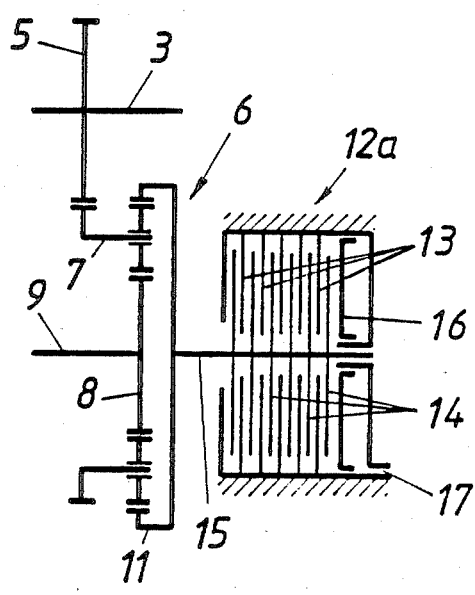
FIG. 2 shows part of the restraining means of FIG. 1 but with a fluid-operable multiple disc brake rather than the liquid friction coupling.

As is shown in FIG. 2 the restraining means may consist of a conventional multiple disc clutch 12a, which has outer annular discs 13 that are held against rotation and circular inner discs which are nonrotatably connected by the shaft 15 to the internal gear 11. The clutch, which constitutes a brake, is also provided with a piston 16 for compressing the discs 13, 14. Fluid pressure is adapted to be applied to the piston 16 by a line 17.

Figure 3:
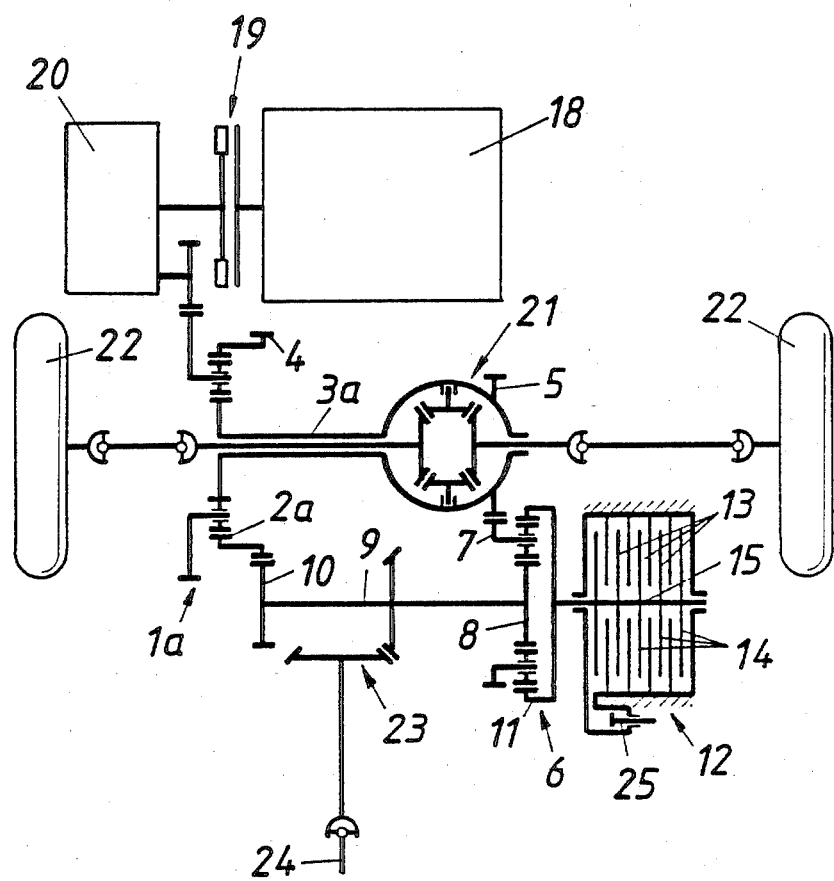
FIG. 3 shows another embodiment of a drive system for a motor vehicle having two driven axles. In that drive system the restraining means provided in accordance with the invention are associated with the interaxle differential connecting the two driven axles of the vehicle.

In the embodiment shown in FIG. 3 the differential to be restrained consists of a planetary gear train 1a and constitutes an interaxle differential connecting the driven front and rear axles of a motor vehicle. The motor 18 of the motor vehicle drives via a drive clutch 19 and a change-speed transmission 20 the planet carrier of the differential 1a. The internal gear 2a constitutes one output member of the differential 1a and is connected to the spur gear 4. The second output member 3a of the transmission is constituted by the sun gear, which is connected by a shaft to the spur gear 5. The shaft 3a drives via a differential 21 the front wheels 22 of the motor vehicle. The shaft 9 drives via a bevel gear train 23 the propeller shaft 24, which is connected to the rear axle. The remainder of the arrangement, namely, the planetary gear train 6 and the restraining means associated therewith, are the same as those shown in FIG. 1 with the difference that a piston 25 is provided for controlling the pressure in the liquid friction coupling 12.

I claim:

1. A drive system for a motor vehicle having two driven axles, comprising
    an interaxle differential having two output shafts, said output shafts respectively operatively connected to said driven axles,
    a planetary gear train comprising first, second, and third torque-transmitting members having parallel axes,
    said first and second torque-transmitting members being respectively operatively connected to said output shafts, and
    a liquid friction coupling having a first coupling half operatively connected to said third torque-transmitting member, and a second coupling half which is held against rotation.

2. The drive system of claim 1, wherein said liquid friction coupling is controllable.

3. The drive system of claim 1, wherein one of said first and second torque-transmitting members is nonrotably connected to a shaft, which is operatively connected to the other of said axles.

4. The drive system of claim 1, wherein said liquid friction coupling comprises a fluid-operable brake.

5. The drive system of claim 4, wherein said brake comprises a multiple disc brake.

6. An interaxle differential for a motor vehicle having two driven axles, comprising
    two output shafts respectively operatively connected to said driven axles,
    a planetary gear train comprising first, second, and third torque-transmitting members having parallel axes,
    said first and second torque-transmitting members being respectively operatively connected to said output shafts, and
    a liquid friction coupling which transmits torque by means of viscous shear forces, said liquid friction coupling having a first coupling half operatively connected to said third torque-transmitting member, and a second coupling half which is held against rotation.

* * * * *